US007268728B1

(12) United States Patent
Struckman

(10) Patent No.: US 7,268,728 B1
(45) Date of Patent: Sep. 11, 2007

(54) MOVING TRANSMITTER CORRELATION INTERFEROMETER GEOLOCATION

(75) Inventor: Keith A. Struckman, Grand Junction, CO (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 210 days.

(21) Appl. No.: 11/249,922

(22) Filed: Oct. 13, 2005

(51) Int. Cl.
*G01S 5/02* (2006.01)
(52) U.S. Cl. ...................... 342/424; 342/451
(58) Field of Classification Search ............. 342/424, 342/451
See application file for complete search history.

(56) References Cited

U.S. PATENT DOCUMENTS

| | | | |
|---|---|---|---|
| 3,935,574 A | 1/1976 | Pentheroudakis | |
| 4,734,702 A | 3/1988 | Kaplan | |
| 5,039,991 A | 8/1991 | Boese et al. | |
| 5,835,060 A | 11/1998 | Czarnecki et al. | |
| 5,870,056 A * | 2/1999 | Fowler | 342/424 |
| 6,985,107 B2 * | 1/2006 | Anson et al. | 342/451 |
| 7,233,285 B2 * | 6/2007 | Struckman | 342/451 |

OTHER PUBLICATIONS

N. Saucier and K. Struckman, *Direction Finding Using Correlation Techniques,* IEEE Antenna Propagation Society International Symposium, pp. 260-263, Jun. 1975.

* cited by examiner

*Primary Examiner*—Gregory C. Issing
(74) *Attorney, Agent, or Firm*—Joseph E. Funk

(57) ABSTRACT

A Moving Transmitter Correlation Interferometer Geo-Location (MT-CIGL) system is disclosed that permits locating both moving and stationary transmitters from moving DF equipment. A conjugate gradient based search routine is utilized which solves for the location of moving and stationary transmitters at the start of each measurement sequence and then solves for the velocity and direction of motion of the moving transmitter. This information is used to track the moving transmitter. Received signals are sampled, digitized and stored in covariance matrices. They are then summed and normalized using an equation that has velocity terms that are set to zero to minimize extraneous correlation peaks, and a maximum correlation peak is developed. A conjugate gradient search routine is used to find the correlation peak of the summed data. The value of the peak is then analyzed to see if it is above or below a predetermined value. If the peak value is above the predetermined value the transmitter is stationary and the located correlation peak is the location of the transmitter. If the peak value is below the predetermined value the transmitter is moving and the peak does not indicate the correct location of the transmitter. Another conjugate gradient search routine is performed using the previous erroneous peak as the starting point for the search to identify the actual location of the moving transmitter at the beginning of a search sequence. That location is then processed through the same equation, but without the velocity terms set to zero, to calculate the velocity and direction of motion of the transmitter. This information can then be used to plot a track for the moving transmitter.

20 Claims, 9 Drawing Sheets $$|R(vx^i,x^i,vy^j,y^j)|^2 = \frac{1}{Me}\sum_{m=1}^{m=Me}\frac{\left(\sum_{n=1}^{Na}\{Q_{m,n}^{ip}A_{m,n}^{ip}(vx^i,x^i,vy^j,y^j)+Q_{m,n}^{qd}A_{m,n}^{qd}(vx^i,x^i,vy^j,y^j)\}\right)^2}{+\left(\sum_{n=1}^{Na}\{Q_{m,n}^{ip}A_{m,n}^{qd}(vx^i,x^i,vy^j,y^j)-Q_{m,n}^{qd}A_{m,n}^{id}(vx^i,x^i,vy^j,y^j)\}\right)^2}$$

Figure 10

$$\frac{\partial|R(vx^i,x^i,vy^j,y^j)|^2}{\partial x^i} = \frac{1}{Me}\sum_{m=1}^{m=Me}\frac{\partial|R(vx^i,x^i,vy^j,y^j)|^2}{\partial x^i}$$

Figure 11A $$\frac{\partial|R(vx^i,x^i,vy^j,y^j)|^2}{\partial y^j} = \frac{1}{Me}\sum_{m=1}^{m=Me}\frac{\partial|R(vx^i,x^i,vy^j,y^j)|^2}{\partial y^j}$$

Figure 11B $$\frac{\partial|R(vx^i,x^i,vy^j,y^j)|^2}{\partial vx^i} = \frac{1}{Me}\sum_{m=1}^{m=Me}\frac{\partial|R(vx^i,x^i,vy^j,y^j)|^2}{\partial vx^i}$$

Figure 11C $$\frac{\partial|R(vx^i,x^i,vy^j,y^j)|^2}{\partial vy^j} = \frac{1}{Me}\sum_{m=1}^{m=Me}\frac{\partial|R(vx^i,x^i,vy^j,y^j)|^2}{\partial vy^j}$$

Figure 11D

MOVING TRANSMITTER CORRELATION INTERFEROMETER GEOLOCATION

FIELD OF THE INVENTION

The present invention relates to direction finding and, more particularly, to correlating signals received from a remote moving transmitter to determine the geographical location of the remote moving transmitter.

BACKGROUND OF THE INVENTION

In the earliest prior art the method of locating the position of a remote, stationary transmitter was to utilize a direction finding (DF) triangulation technique where signals from the transmitter are received at widely spaced DF antenna sites. A line-of-bearing (LOB) measurement to the transmitter is measured at each antenna site. When the LOBs are plotted on a map they intersect at the transmitter location. The accuracy of this intersection is directly related to the accuracy of these lines-of-bearing.

A typical radio frequency interferometer system computes an angle of arrival (AOA) of a signal received from a remote, stationary transmitter by utilizing the phase difference of the transmitter signal arriving at individual antennas of an array. The remote transmitter is located by utilizing the amplitude and phase difference of a signal from the transmitter arriving at different antennas of an antenna array. The phase measurements of the interferometer can be AOA ambiguous if the baselines of the antenna array, that is the separation of the antennas of the array and used to measure signal phase, is greater than half the wavelength of the incoming signal. The number of ambiguous AOA's is closely approximated by the ratio of the interferometer baseline to the emitter wavelength and one key to successful emitter geolocation estimation is to correctly resolve these potential ambiguities by careful DF array design and measurement processing.

As the interferometer baseline length increases, thereby increasing the number of AOA ambiguities, the phase measurement accuracy increases, and the rapidity of transmitter ranging to the required accuracy improves due to the more accurate bearing measurements. Thus, the desire for accurate bearing measurements, requiring a long interferometer baseline, conflicts with the need for robust phase or AOA ambiguity resolution, which is easier to accomplish with a short baseline. In addition, long baselines are difficult to achieve when the receiving apparatus is on an aircraft.

One technique to overcome this complexity is to use an AOA ambiguous long baseline interferometer or (LBI). One approach to passive ranging utilizing an LBI to resolve the AOA ambiguities, which are identical to the antenna array grating lobes, is by phase tracking the emitter signal during the relative motion of the platform, such as an aircraft, containing the DF antenna array. Lobe tracking is utilized in which 2n solutions are set up for an array with a length of nλ, where λ is the wavelength of the transmitter signal and n is an integer. Only one of the potential solutions converges to the true solution with the remainder being rejected as diverging. Phase tracking is continuously performed by the lobe tracking process in order to eliminate all but one of the potential solutions so that the ambiguity integer m, which determines the number of 2π cycles which must be added to the interferometer phase measurement to correctly identify the correct AOA, is determined.

The phase tracking approach has certain drawbacks. For instance, the signal can be interrupted by terrain blockage or intermittent emitter operation and the trend on the ambiguity integer m (phase tracking) is lost. Additionally, vibration can distort the trend and hinder correct ambiguity resolution. Observer attitude motion can cause large changes in the ambiguity integer, m. These changes are difficult to separate from translational motion relative to the emitter.

Another drawback to the phase tracking approach is that the number of lobes, i.e. potential solutions, is determined by the ratio of d/λ, where d is the baseline length and λ is the signal wavelength.

U.S. Pat. No. 5,835,060 entitled "Self-resolving LBI Triangulation" also teaches a long base line interferometer (LBI) system for determining the position of a transmitter. The system has two antennas and the phase differences between the signals received by the antennas at each end of the long base line are monitored as the interferometer moves along a measurement path to obtain repetitive phase difference measurements distributed along the measurement path. To determine the location of the transmitter, a cost function is evaluated to select one of a set trial grid points for the transmitter. The position of the transmitter is then estimated by least squares convergence using the selected trial grid point as a starting point.

The measured phase difference corresponds to the angle of arrival of the transmitted signal plus an unknown constant minus an unknown integer multiple of 2π. The measured phase difference (in radians) can be expressed as follows:

$$\Phi = \left[\Phi_0 + \frac{2\pi l}{\lambda}\cos\theta\right]\mod 2\pi \qquad (EQ\ 1)$$

in which $\Phi$ is the measured phase difference, $\Phi_0$ is an unknown constant, L is the length of the baseline of the LBI antenna, $\lambda$ is the wavelength of the transmitted signal and $\theta$ is the angle of arrival of the transmitted signal relative to the LBI base line. This approach has a limitation in that it cannot handle signals from arbitrarily polarized transmissions. Computing directions to arbitrarily polarized transmissions, requires both phase and amplitude RF measurements on more than two antennas.

Another prior art passive ranging approach utilizes a short baseline/long baseline interferometer or SBI/LBI system in which at least two SBI measurements separated in time are needed to resolve the two-antenna element LBI ambiguity. This approach is described in U.S. Pat. No. 4,734,702 "Passive Ranging Method and Apparatus".

U.S. Pat. No. 5,039,991, entitled "Perturbation modeling system for use in processing direction-finding antenna outputs" teaches and claims a system for compensating for perturbations of received electromagnetic radiation caused by the various surfaces of an aircraft by correlating antenna outputs to representative data in a database that is empirically derived during calibration of the system at a plurality of scaled electromagnetic radiation frequencies to determine the proper azimuth and elevation associated with transmissions.

U.S. Pat. No. 4,734,702 discloses two approaches utilizing SBI/LBI. One approach locates the target with SBI derived measurements and uses the SBI range to predict the LBI phase change. This approach requires some SBI location convergence before improving it with the LBI. The use of the SBI phase difference to initially compute a slant range means this method will not initially converge faster than a more conventional SBI-only system until range accuracy sufficient to resolve the LBI has been achieved. In order to overcome this slow initial convergence to the range estimate, a second technique is used instead, if the slow initial convergence is intolerable.

The second technique utilizes the SBI unit direction-of-arrival vector (DOA) to predict the LBI phase change. This technique does not require location to any accuracy before differentially resolving the LBI with sequential SBI measurements, and hence provides rapid convergence to an accurate range estimate. However, this SBI/LBI technique has the drawback of limiting the SBI/LBI baseline ratio, and requiring the use of a medium baseline interferometer (MBI) in many cases. It also requires a two dimensional (2-D) SBI to measure emitter direction of arrival or DOA, as opposed to just a one dimensional interferometer array measuring AOA.

The baseline restriction existing in the conventional SBI/LBI approach necessitates the addition of more antenna elements and receivers to obtain the LBI baseline required to achieve the desired range accuracy quickly. This introduces extra complexity, cost and weight to a system.

One technique to overcome the extra complexity, cost and weight is to use an AOA ambiguous long baseline interferometer or LBI. One early approach to passive ranging utilizing an LBI which may have only two antenna elements is disclosed in U.S. Pat. No. 3,935,574 by Pentheroudaki. This approach resolves the AOA ambiguities, which are identical to the antenna array grating lobes, by phase tracking the emitter signal during the relative motion of the platform containing the antenna array. Such lobe tracking is utilized in which (2n) solutions are set up for an array with a length of nλ, where λ is the transmitter signal wavelength and n is an integer. Only one of the potential solutions converges to the true solution with the remaining possible solutions being rejected as diverging. Phase tracking is continuously performed by a lobe tracking process in order to eliminate all but one of the potential solutions so that the ambiguity integer m, which determines the number of $2\pi$ cycles which must be added to the interferometer phase measurement to correctly identify the correct AOA, is determined.

As described above, a typical DF interferometer system locates a remote transmitter by utilizing the phase difference of the transmitter signal arriving at the individual antennas. DF accuracy of such systems is directly related to DF array aperture size which is determined by the spacing between multiple antennas of antenna array of the DF system. All other things being equal, larger DF apertures increase LOB accuracy generating more accurate transmitter fixes. However, simply increasing DF aperture sizes without increasing the number of DF antennas leads to large amplitude correlation side lobes and a real potential for large errors. Therefore, such prior art DF systems require many antennas and DF receivers and are very expensive. The need for more antennas and more DF receivers negatively affects their use on aircraft.

In summary, accurate transmitter geo-location computations require long baseline interferometer (LBI) accuracy's. Theoretically only three antenna elements are required for unique $2\pi$ radians azimuth coverage, but conventional DF interferometer systems must utilize a number of additional antenna elements and receivers to control the gross error rate of a resulting from the inherent AOA ambiguity in phase measurement.

As will be appreciated, the number of antenna elements required by airborne DF interferometer systems leaves a limited amount of space for other sensors on the aircraft's exterior. Thus, it is desirable to provide a DF interferometer system for aircraft that needs only a few antenna elements while providing the same or greater transmitter location accuracy as prior art systems.

The requirement for a DF interferometer system for aircraft that needs only a few antenna elements while providing greater stationary transmitter location accuracy has been met by moving the correlation process from a Correlation Interferometer Direction Finding (CIDF) AOA function into the transmitter location function. Correlation interferometer direction finding solutions are based on the correlation summation of voltages measured at the antennas of a DF antenna array. See a paper by N. Saucier and K. Struckman, *Direction Finding Using Correlation Techniques*, IEEE Antenna Propagation Society International Symposium, pp. 260-263, June 1975, which teaches the same concepts as taught in U.S. Pat. No. 5,039,991. Correlation Interferometer Geo-Location (CIGL) digitally correlates sets of measured antenna array voltage vectors against a calibration array manifold that is indexed as a function of grid locations on a correlation surface. This moves the correlation function directly to the surface of the earth and provides geolocation information for transmitters. However, such transmitters must be stationary in order to obtain accurate, reliable geolocation information. This is due to the fact that movement of a transmitter during data collection leads to an inability to converge on a location fix. Ambiguous, erroneous geolocation information is the result.

Accordingly, there is a need for a DF interferometer system for moving aircraft that has a minimum number of DF intercept antennas, and that can obtain accurate, reliable geolocation information for moving transmitters.

SUMMARY OF THE INVENTION

Problems associated with prior art aircraft DF techniques and systems for locating moving transmitters are minimized in accordance with the teaching of the present invention. A novel method and apparatus for providing an accurate Moving Transmitter Correlation Interferometer Geo-Location (MT-CIGL) system is taught that requires fewer antennas and associated receivers than used in the prior art while providing accurate geo-location information. MT-CIGL adds a moving transmitter conjugate gradient based search routine which solves for the location of the transmitter at the start of the measurement sequence and the velocity and direction of motion of the moving transmitter. This information is used to track the moving transmitter. Very broadly, this is accomplished by moving correlation processing from the correlation interferometer direction finding (CIDF) angle of arrival (AOA) function into the transmitter location function. Correlation interferometer direction finding (CIDF) solutions are based on the correlation summation of voltages measured at the antennas of a DF antenna array.

The novel MT-CIGL system taught herein first processes received signal data to determine the geolocation of the transmitter assuming that it is not moving. This is done to determine if the transmitter is stationary or is moving. If it is determined that the transmitter is not moving, the geolocation just determined is the actual geolocation of the transmitter. If it is determined that the transmitter is moving the received signal data is processed further to determine the initial location of the transmitter at the start of the measurement sequence and the velocity components $v_x$ and $v_y$ in the X and Y directions. This is done by digitally correlating sets of measured antenna array voltage vectors against a calibration array manifold that is indexed as a function of grid locations on a correlation surface. This moves the correlation function directly to the surface of the earth and provides accurate geolocation information of both moving and stationary transmitters.

More particularly, this is done by summing and normalizing stored transmitter signal data sets and signal eigenvectors derived therefrom and performing a first conjugate gradient search on the summed and normalized data assuming that the target transmitter is not moving. The conjugate gradient search routine is performed to locate the highest surface dependent correlation peak $|R_{maximum}(v_x=0, v_y=0)|^2$. If the value of $|R_{maximum}(v_x=0, v_y=0)|^2$ exceeds a certain value that has been empirically determined it is assumed that the transmitter is not moving. The x,y location where $|R_{maximum}(v_x=0, v_y=0)|^2$ has been computed indicates the geolocation of the stationary transmitter.

If, however, $|R_{maximum}(v_x=0, v_y=0)|^2$ is less than the empirically determined value it is rightfully assumed that the transmitter is moving. Thus, the x,y location of $|R_{maximum}(v_x=0, v_y=0)|^2$ determined using the first conjugate gradient search routine is erroneous.

Further conjugate gradient processing of the digitized, received signal data sets stored in the covariant matrices and the eigenvectors derived therefrom is performed using a conjugate gradient based equation that computes velocity components $v_x$ and $v_y$ in addition to the initial $(x_0,y_0)$ location of the moving transmitter at t=0 (the beginning of collecting asset of received signal data). The erroneous location of the peak $|R_{maximum}(v_x=0, v_y=0)|^2$ is used as the starting point of the search to locate the correct $|R_{maximum}|^2$, the initial location $(x_0,y_0)$ and the velocity $(v_x,v_y)$ and direction of motion of the transmitter.

Using the initial, actual position of the moving transmitter at t=0 and the velocity and direction of motion of the transmitter, a track of the moving transmitter may be determined.

To correct for array distortions, such as aircraft electromagnetic scattering, a calibration array manifold correlation table constructed during system calibration is used during processing. The collected data is processed and corrected using the calibration table.

DESCRIPTION OF THE DRAWING

The invention will be better understood upon reading the following Detailed Description in conjunction with the drawings, based on a typical 10 meter 4 element cross DF array operating at 100 MHz in which:

FIG. 10 is the equation with velocity components used to calculate data sets to display the correlation surfaces;

FIGS. 11A-11D are equations used to perform conjugate gradient searching to find the initial position of a transmitter at the beginning of signal processing period and the direction and velocity of its motion;

DETAILED DESCRIPTION

Figure 1:
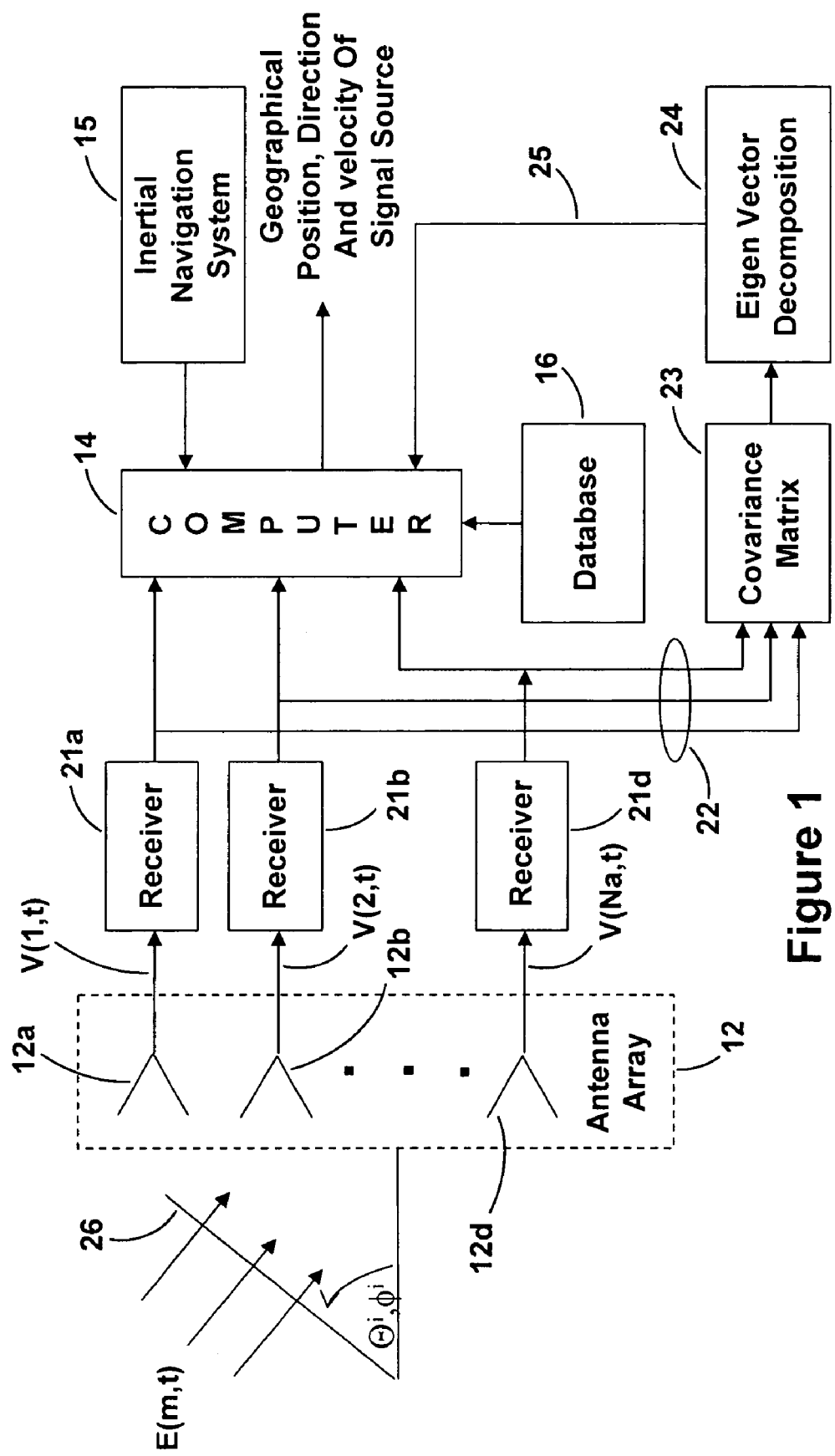
FIG. 1 is a block diagram of a DF system that utilizes the teaching of the present invention to provide geolocation information for a transmitter remote to an aircraft.

In the following detailed description and the drawings there are numerous terms used that are defined below:

$A(\theta,\phi)$=the calibration array manifold and there is a different manifold for use with received signals at different frequencies.

$V^c(\theta^i, \phi^i)$ and $H^c(\theta^i, \phi^i)$ vertical and horizontal array calibration measurements $\rho^k$=polarization vector.

AOA=angle of arrival.

CIDF=Correlation Interferometer Direction Finding.

MT-CIGL=Moving Transmitter Correlation Interferometer Geo-Location.

DF=direction finding.

E=electromagnetic radio waves incident on the array of antennas.

Me=the number of data sets made from the received signal, 180 herein

Na=number of antennas in the beam forming/direction finding array, 4 herein.

(O)*=complex conjugate of (O).

(ip, qd)=in-phase and quadrature-phase of a complex quantity.

PI-CIGL=polarization independent correlation interferometer geo-location.

$|R(x^i,y^j)|^2$=global correlation surface over a set of $(x^i,y^j)$ grid points.

Rxx=measured covariance matrix.

λ=eigenvalues of the measured covariance matrix.

Q=signal eigenvector of the measured covariance matrix.

SNR=signal-to-noise ratio.

V(n,t) antenna eigen vectors for signal received at antenna "n".

$(x_0, y_0)$ indicate the x,y location of the moving transmitter at time equal to zero which is the start of receiving and storing signals from a moving transmitter.

$v_x$ is the velocity component of the moving transmitter in the x direction.

$v_y$ is the velocity component of the moving transmitter in the y direction.

In the following description a "moving transmitter" is referred to. Radio frequency transmissions are being emitted from the moving transmitter which may be in a car or truck, but also may be on an aircraft or water craft, or may be manually carried.

In the following description eigenspace is defined as follows. If $R_{xx}$ is an Na×Na square matrix and λ is an eigenvalue of $R_{xx}$ then the union of the zero vector 0 and the set of all eigenvectors corresponding to eigenvalues λ is known as the eigenspace of λ. The terms eigenvalue and eigenvector are well known in the art.

In the following description reference is made to eigenspace decompositions. eigenspace decompositions are well known in the art and are used in solving many signal processing problems, such as source location estimation, high-resolution frequency estimation, and beam forming. In each case, either the eigenvalue decomposition of a covariance matrix or the singular value decomposition of a data matrix is performed. For adaptive applications in a non-stationary environment, the eigenvalue decomposition is updated with the acquisition of new data and the deletion of old data. This situation arises where a transmitter or receiver are moving with relation to each other. For computational efficiency or for real-time applications, an algorithm is used to update the eigenvalue decomposition code without solving the eigenvalue decomposition problem from the start, i.e., an algorithm that makes use of the eigenvalue decomposition of the original covariance matrix. In numerical linear algebra, this problem is called the modified eigenvalue problem. In the example of the invention disclosed herein, with only one signal being received, the array vector for that signal is equal to its eigenvector.

In FIG. 1 is a detailed block diagram of a DF system that utilizes the teaching of the present invention to provide MT-CIGL geographical position (geolocation) information for remote transmitters that are not shown in this Figure. MT-CIGL adds a moving transmitter conjugate gradient based search routine which solves for the location and velocity of the moving transmitter. This information is then used to calculate a track for the moving transmitter.

Figure 2:
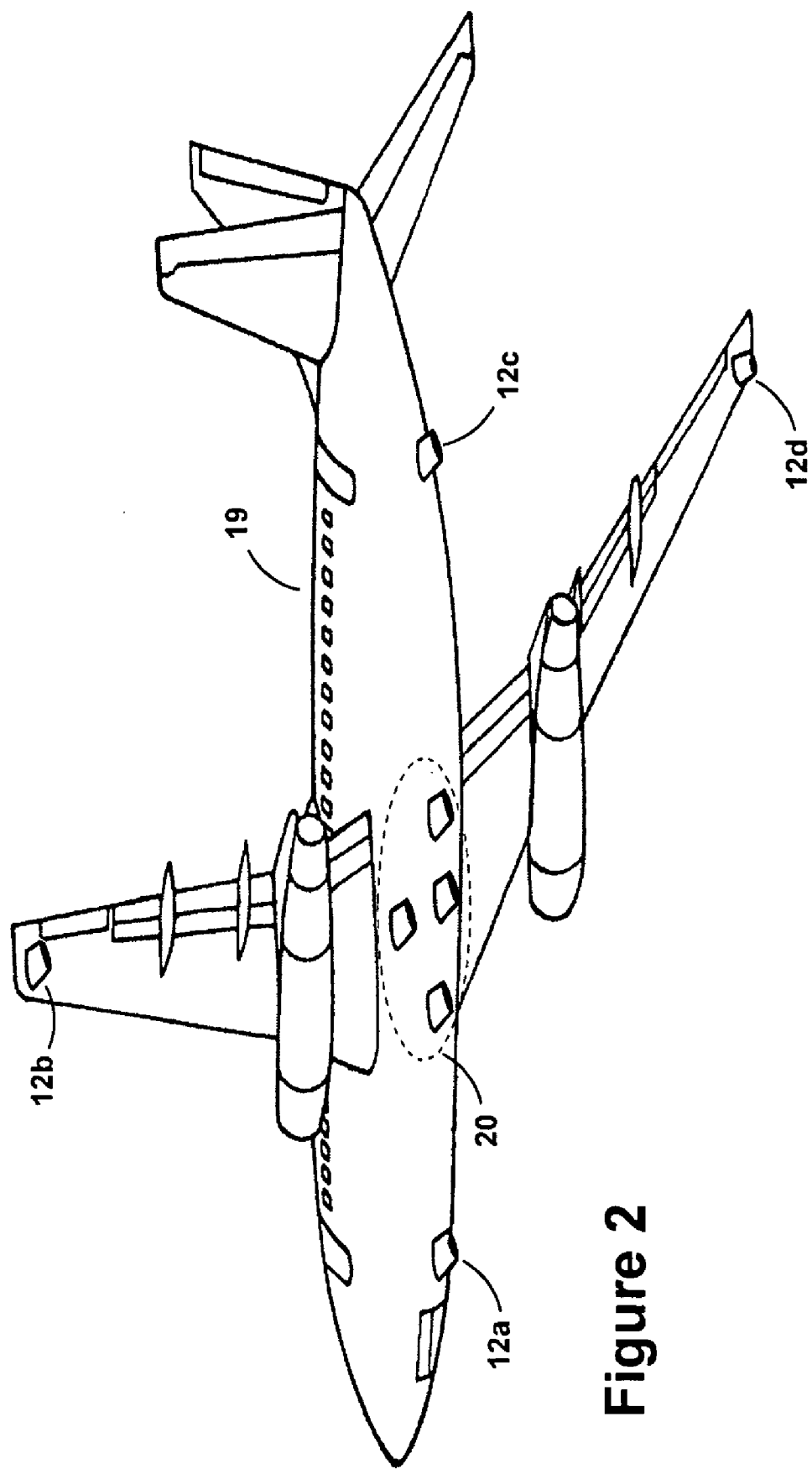
FIG. 2 shows an aircraft on which is mounted a number of individual antennas comprising a DF antenna array for use with the present invention and a small array that represents DF arrays associated with most prior art geolocation techniques.

Antenna array 12 consists of four antenna elements 12a through 12d, as shown on aircraft 19 in FIG. 2. However, more than four antennas may be utilized. The individual antenna elements 12 are arranged in a pattern on aircraft 19, as shown in FIG. 2, to give adequate coverage (pattern gain) over a desired spatial region. However, the antennas 12 may be arranged differently than shown in FIG. 2. The selection of antenna elements 12 and their physical arrangement on aircraft 19 are dependent on the frequencies to be received and their polarization, and there may be more than one set of antennas 12 on aircraft 19 to cover different frequency bands and signal polarization.

In FIG. 1, an incident electromagnetic signal E(t) 26 impinges on antenna array 12 and arrives at each antenna element 12a-d at different times as determined by its angle of incidence $\theta^i$, $\phi^i$ with respect to array 12 and the spacing of the antenna elements 12a through 12d. The actual signal E(t) 26 may comprise a number of co-channel interfering signals but the operation described herein is with only one signal. The voltage terms V(1,t) through V(Na,t) output respectfully from antennas 12a through 12d denote the complex waveform envelope that is output from each of antenna 12a-d and is the only quantity that conveys information. Therefore, each of the received signals V(1,t) through V(Na,t) represents the complex envelope of the output of one antenna element of antenna array 12 and represents one or more signals, one of which may be a signal of interest and a noise component η(n,t), and is represented by the equation EQ2:

$$V(n,t)=E(t)A_r[n,\theta^i,\phi^i]+\eta(n,t) \quad (EQ\ 2)$$

where "n" corresponds to one of the four antennas comprising antenna array 12, and in V(n,t) designates one of the complex voltages V(1,t) through V(Na,t). E(t) is the incident electromagnetic signal impinging on antenna array 12. $A_r[n, \theta^i, \phi^1]$ is an antenna response vector where is "n" is as defined above, $(\theta^i,\phi^i)$ defines the azimuth direction $\theta^i$, and elevation direction $\phi^i$ of received signals, and η(n,t) is a noise component of received signal V(n,t).

The voltages V(1,t) through V(Na,t) output respectively from ones of antenna elements 12a through 12d are respectively input to one of receivers 21a through 21d as shown. The signals, in digitized format, output from receivers 21a through 21d are input to signal processing computer 14, and are also carried over leads 22 to circuit 23 where signal samples are measured and processed into individual measurement covariance matrices in a manner well known in the art. More detail of the processing performed in FIG. 1 is given further in this specification.

More particularly, signals received from a moving transmitter on the antenna elements 12a through 12d mounted on the surface of an aircraft are sampled, digitized and stored in a plurality of covariance matrices. The typical sequence is to Nyquist sample the received signal and record a set of samples for each antenna of the DF antenna array located on the surface of the DF aircraft. A number (180) of sets of these signal samples are measured and processed into individual measurement covariance matrices during the search for the location of the moving transmitter, typically one set for each second of flight. The stored covariance processed signal samples undergo eigenspace decomposition to produce signal eigenvectors (array vectors) containing azimuth and elevation (θ,φ) radio wave arrival information for each of the sampling periods.

In block 24 of FIG. 1 each set of covariance matrices undergo the eigenspace decomposition to produce the signal eigenvectors having azimuth and elevation (θ,φ) and other information for each of the one-hundred eighty sampling periods that is forwarded to computer 14 via path 25. The signal eigenvectors are equal to conventional array steering vectors. The functions performed in blocks 23 and 24 are performed by a processor in a manner known in the art. The processes performed in blocks 23 and 24 may be performed by computer 14 but the functions performed are shown as separate blocks 23 and 24 to aid in understanding the invention. Covariance matrices and eigenspace decompositions are both well known in the art and are used in solving many signal processing problems, such as source location estimation, high-resolution frequency estimation, and beam forming. The parallel receiver channel architecture of covariance matrix processing is used to ensure that all of the one-hundred eighty correlation surfaces are associated with a single remote transmitter and that the measured data is not corrupted by co-channel RF interference. Multiple co-channel signals are identified by observing measured covariance matrix eigenvalues. Single signal conditions establish one strong signal eigenvalue and Na-1 noise eigenvalues when intercepted by an array of Na antennas and received on Na RF channels.

For adaptive applications in the non-stationary environment of the present invention, the eigenvalue decomposition is updated with the acquisition of new data and the deletion of old data every few minutes. This occurs for each of the previously mentioned one-hundred eighty sets of signal samples taken from the antennas. For computational efficiency or for real-time applications, an algorithm is used to update the eigenvalue decomposition code without solving the eigenvalue decomposition problem from the beginning again, i.e., an algorithm that makes use of the eigenvalue decomposition of the original covariance matrix. In numerical linear algebra, this problem is called the modified eigenvalue problem.

In FIG. 2 is shown an aircraft 19 on which are mounted individual antennas (12a-12d) comprising DF antenna array 12. Antennas 12a and 12c are mounted to the front and rear of the fuselage of aircraft 19. Antennas 12b and 12d are mounted near the ends of the wings of aircraft 19. This spacing of antennas 12a-12d provides a relatively large antenna aperture to facilitate accurate MT-CIGL geolocation solutions.

Each of antennas 12a-12d is a monopole or "blade" type antenna elements for the MT-CIGL process and they are arranged in the configuration shown that is symmetric about the centerline of aircraft 19. For many applications, these blade antennas can be replaced by broadband spiral antennas that are receptive to both horizontally and vertically polarized signals.

Also shown in FIG. 2 is a typical prior art layout 20 of airborne DF antennas. They are typically greater in number, although not shown in this figure, and must be spaced closer together than with the present invention. As described in the background of the invention, conventional DF accuracy in the prior art is a balance of a number of antennas comprising a DF antenna array versus their spacing. To achieve high DF accuracy the antennas 20 are spaced as far as possible from each other, but to minimize ambiguities there must be a sufficient number of antennas 20 and they cannot be too far apart. These constraints typically constrain the array to a small area near the center of the fuselage as shown by 20.

The effect of large correlation side lobes created when using a small number of DF array antennas on an aircraft in the prior art is negated using the geolocation method of the present invention where the correlation process is moved from the DF function to the transmitter location function. A smaller number of antennas in the array may be used, coupled with a relatively large antenna aperture, and still achieve high geolocation accuracy.

Figure 3:
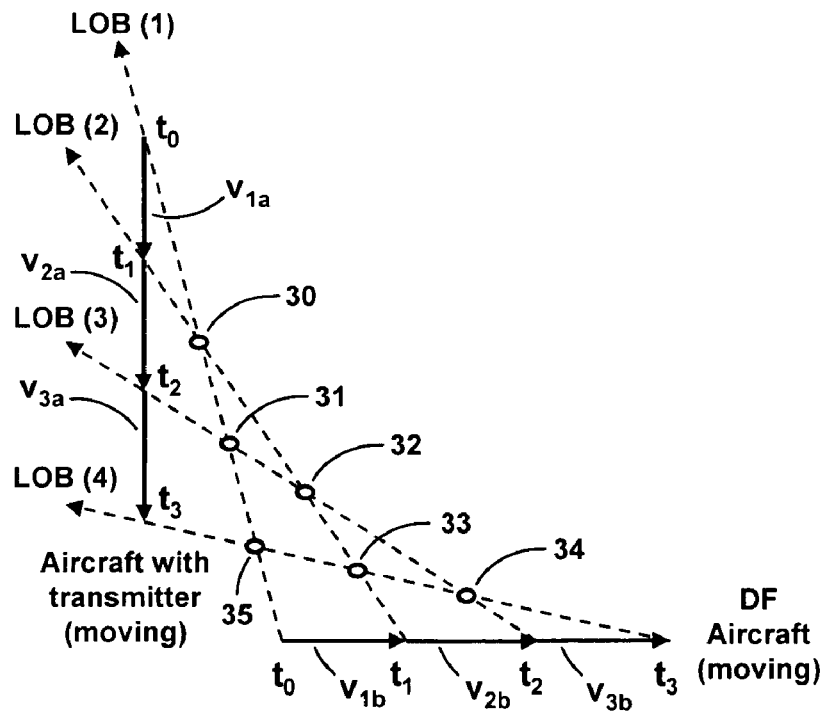
FIG. 3 is a graph that shows the errors that occur when using prior art line of bearing direction finding when attempting to locate a moving transmitter.
Figure 4:
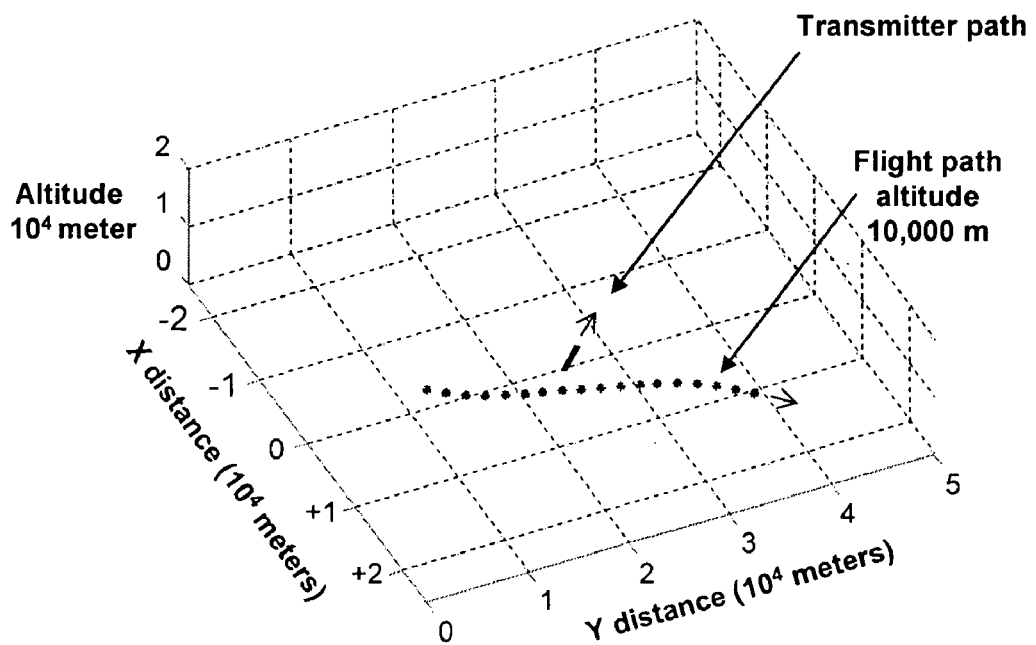
FIG. 4 shows a graphical representation of a moving transmitter and the flight path of a DF aircraft flying at 345 knots being used to locate the moving transmitter.

In FIG. 3 is shown a track of an aircraft with a transmitter moving in one direction with reference to the track of an aircraft having prior art DF equipment which is moving in a different direction. A transmitter on an aircraft is used only for this explanation because it is easier to see the errors on the graph. A small portion of the flight path of the DF aircraft is shown as vectors $v_{1b}$, $v_{2b}$ and $v_{3b}$ while a small portion of the flight path of the aircraft with the transmitter is shown as vectors $v_{1a}$, $v_{2a}$ and $v_{3a}$. The length of the vectors represent the distance traveled by the two aircraft between times $t_0$, $t_1$, $t_2$ and $t_3$. In FIG. 3 the length of all vectors is the same indicating that the two aircraft are traveling the same speed, but this need not be so. The speed of the two aircraft will most likely be different, as well as the directions of flight.

At time $t_0$ the moving DF aircraft receives a signal transmitted from the transmitter on the moving aircraft and determines a line of bearing LOB (1). At time $t_1$ the moving DF aircraft receives a signal transmitted from the moving transmitter and determines a line of bearing LOB (2). At time $t_2$ the moving DF aircraft receives a signal transmitted from the moving transmitter and determines a line of bearing LOB (3). At time $t_3$ the moving DF aircraft receives a signal transmitted from the moving transmitter and determines a line of bearing LOB (4). When conventional geolocation equipment and techniques are used the intersecting lines of bearing indicate that the moving transmitter is at eight different positions 30-35. These six locations are ambiguous and are no where near the actual position of the aircraft with the transmitter. Thus, it can be seen that prior art DF equipment on a moving aircraft cannot accurately geolocate a moving transmitter from which transmissions are emitting.

Returning to the description of the operation of the MT-CIGL equipment with reference to FIG. 1. Signals received on the antennas of the MT-CIGL antenna array on the DF aircraft are sampled, digitized and stored in a plurality of covariance matrices in a manner known in the art. A typical processing sequence is as follows. Once a second for one-hundred eighty consecutive seconds the received signals (V(1,t)-V(Na,t)) received on the individual antennas of antenna array 12 are digitized and sampled at a 100 Kilohertz rate to generate 1024 samples for each antenna of the antenna array. The one-hundred eighty sets of signal samples are processed into individual covariance matrices. Thus, sampling is done for approximately ten milliseconds out of every second. The covariance matrices undergo eigenspace decomposition to produce one-hundred eighty signal array vectors having transmitter azimuth and elevation $(\theta,\phi)$ and other information for each of the one-hundred eighty sampling periods. The preferred way to develop an array vector is to decompose a covariance matrix as a signal eigenvector and associate an array vector with the signal eigenvector.

It is usually not known initially if the transmitter is moving. To reduce the potential for ambiguities and improve moving transmitter geolocation accuracy, which can occur even with CIGL processing, the DF aircraft should perform some turns as the signal from the moving transmitter are being received. For example, the DF aircraft may be flying at a speed of 345 knots when it initially receives a signal from the transmitter on the target aircraft, and the DF aircraft will initially perform a slow turn to the right for thirty seconds. The DF aircraft will then slowly decreases the rate of the turn for thirty seconds until it is flying straight and level in a new direction. The DF aircraft then performs a slow left turn for thirty seconds followed by slowly decreasing the rate of the turn for thirty seconds until it is flying straight and level, probably at the original heading. Typically, the total length of time of the turns described above is in the order one-hundred eighty seconds. The length of time of the turn to the left or right, whether or not the right turn is performed before the left turn, and the total number of degrees during the turn in either direction is not critical. It is only important that the turns are sufficient for the DF equipment to remove the ambiguities in the calculations for the received signals. A typical ambiguous condition is created when the DF aircraft and moving transmitter traverse straight parallel paths.

To correct for array distortions caused by the aircraft on which the antennas are mounted, a calibration array manifold correlation table constructed during system calibration is accessed to read out data that defines geometric grid locations that define a correlation surface for each of the one-hundred eighty sampling periods. There are multiple correlation tables created during system calibration at different frequencies over the range of frequencies at which the MT-CIGL system on the DF aircraft will operate. During operation the particular correlation table used during signal processing will be for the frequency closest to the frequency of the signal received from the moving transmitter and corrections are applied to the 180 data sets.

Figure 5A:
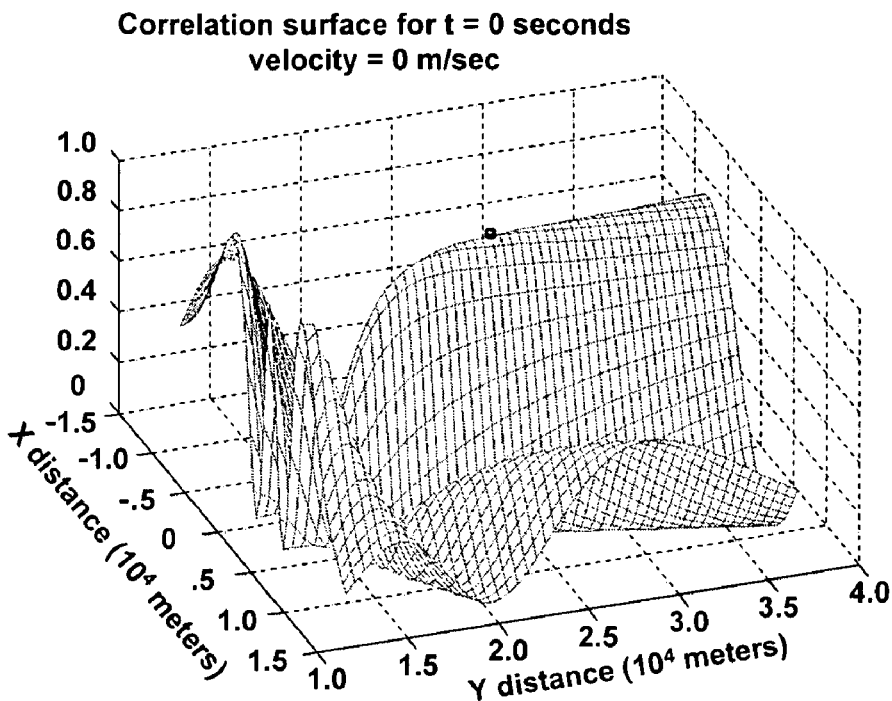
FIGS. 5A and 5B respectively show correlation surfaces derived using stored, decomposed transmitter data and assuming that the transmitter is not moving, and the correlation surface derived using the same data after it is determined that the transmitter is moving and using a calculated initial position, velocity and direction of motion of the transmitter.
Figure 5B:
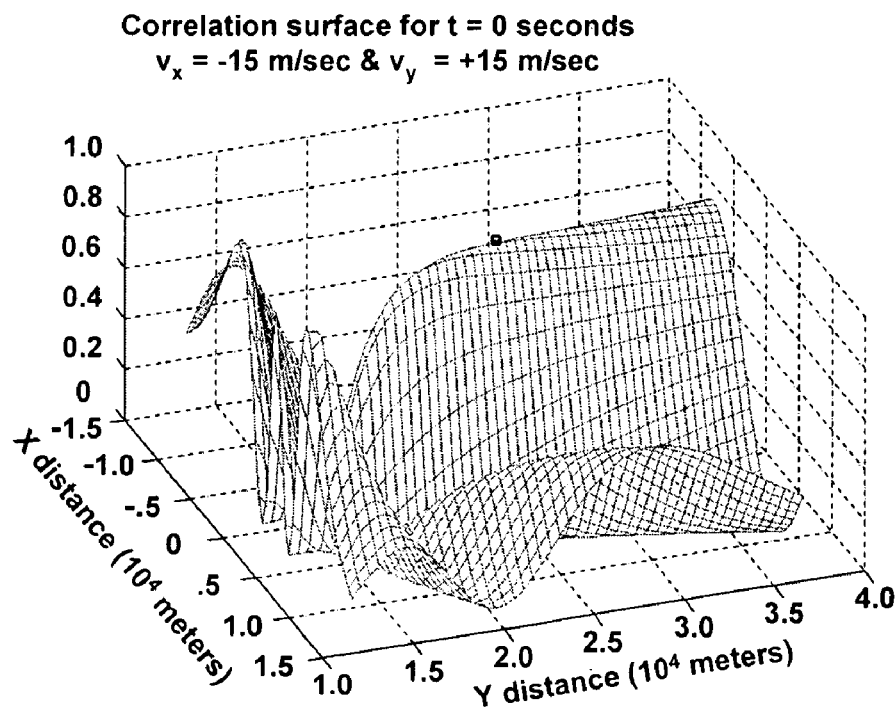
Figure 6A:
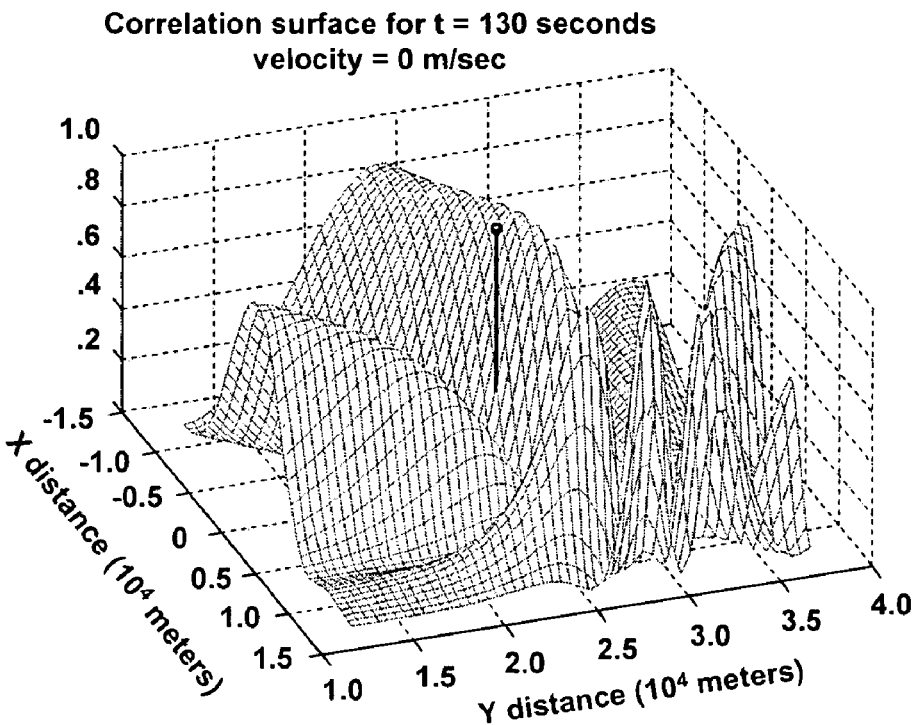
FIGS. 6A and 6B respectively show the correlation surfaces derived using the stored, decomposed transmitter data received 130 seconds after the start of processing and assuming that the transmitter is not moving, and the correlation surface derived using the same set of transmitter data after it is determined that the transmitter is moving and using the calculated initial position, velocity and direction of motion of the transmitter.
Figure 6B:
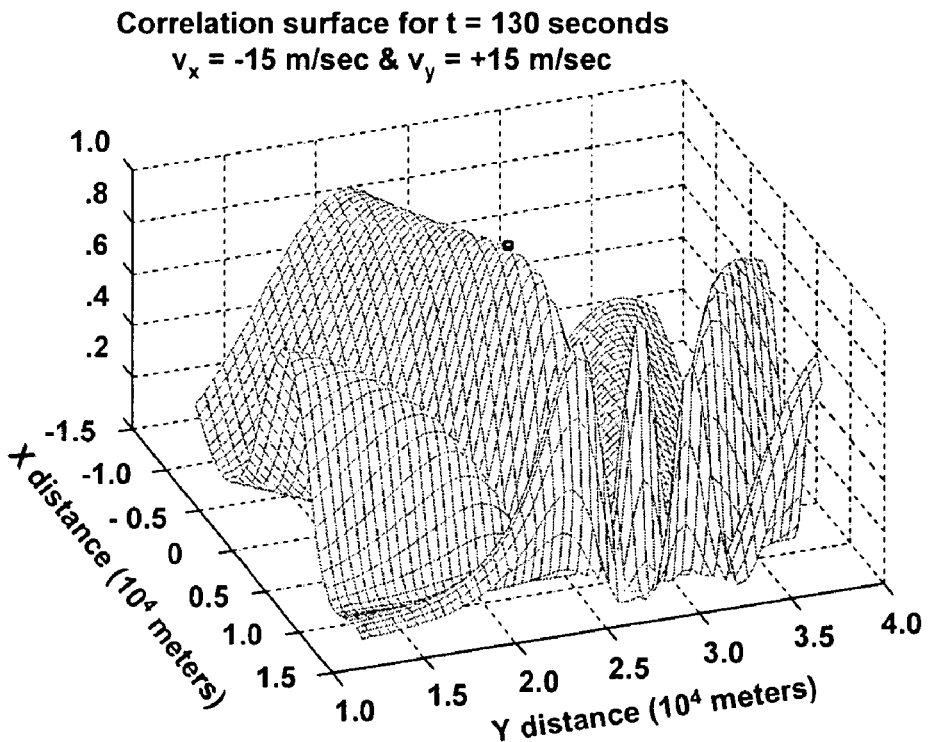
Figure 7A:
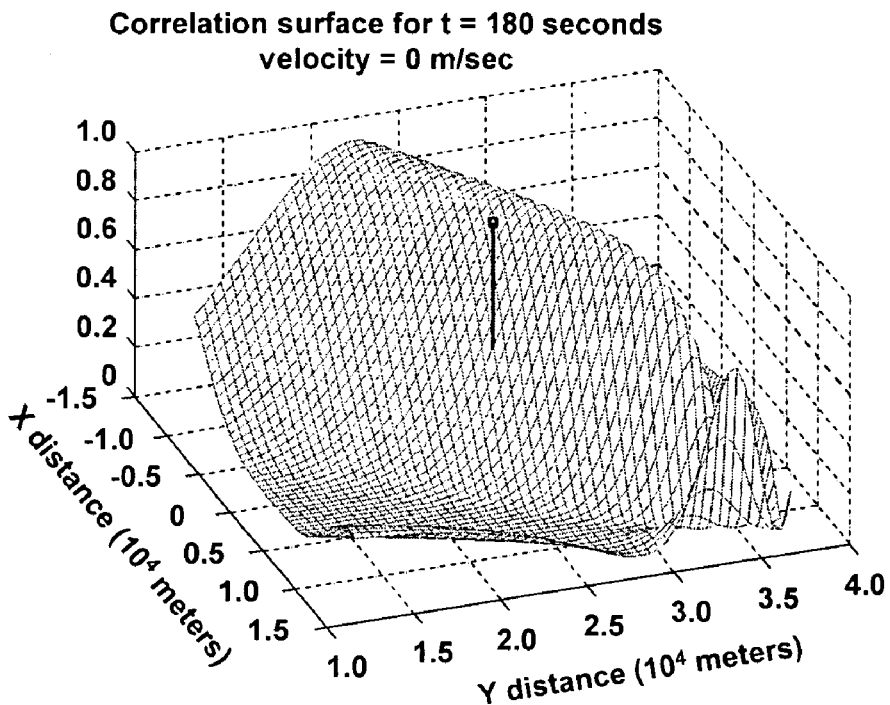
FIGS. 7A and 7B respectively show the correlation surfaces derived using the stored, decomposed transmitter data received 180 seconds after the start of processing and assuming that the transmitter is not moving, and the correlation surface derived using the same set of transmitter data after it is determined that the transmitter is moving and using the calculated initial position, velocity and direction of motion of the transmitter.
Figure 7B:
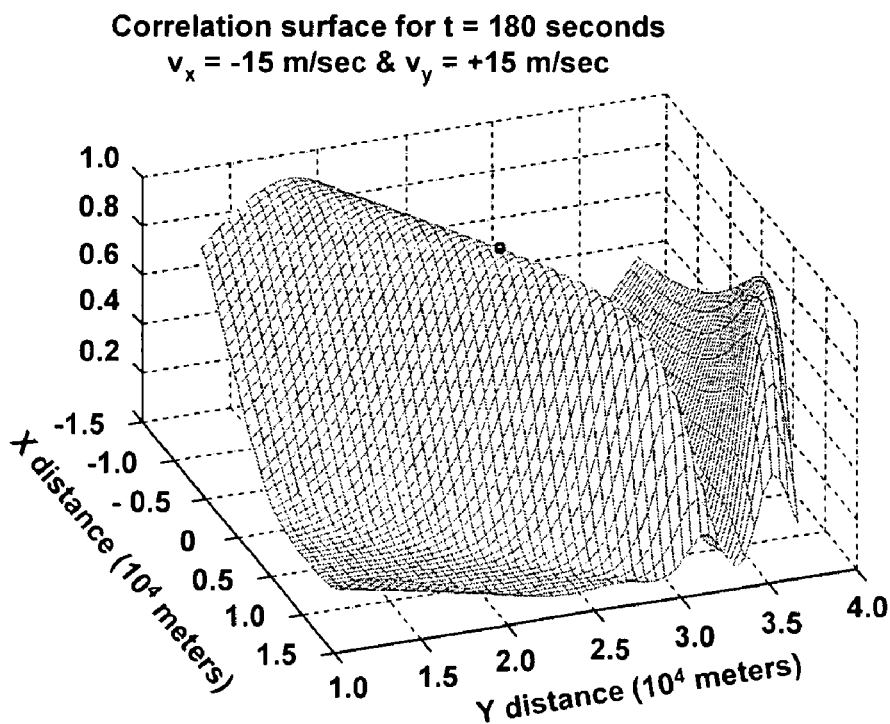

If the 180 decomposed data sets are processed through the equation in FIG. 10 (assuming that velocity of the transmitter is zero) and then graphed they show the correlation surfaces representatively shown in FIGS. 5A, 6A and 7A. The correlation surfaces graphed from each of the one-hundred eighty sets of decomposed data sets and their resulting eigen vectors are different from each other. The three examples of these surfaces at t=1 second, t=130 seconds and t=180 seconds are shown in FIGS. 5A, 6A and 7A. The plotting of the correlation surfaces, such as shown in these Figures are not required to practice the teaching of the invention, but they are shown and described herein to help understand the invention.

Each of the 180 correlation surfaces has a number of peaks, valleys and ridge-lines. Under ideal conditions, the highest ridge-line of each independent correlation surface points in the direction from the DF aircraft to the remote transmitter at the time the data was taken and from which the correlation surfaces are derived. In addition, in the prior art the highest peak of the highest ridge line of a correlation surface would be where the transmitter is located if the transmitter is not moving. This is not true when the transmitter is moving. With the transmitter moving the correlation surface ridges are moving. The actual position of the transmitter at t=0, is on the sides of the ridges when the transmitter is moving as indicated by the dark vertical lines in FIGS. 6A through 7A. The prior art has no way to account for a moving transmitter. In accordance with the teaching of the invention the velocity of the moving transmitter must be taken into account.

Figure 8A:
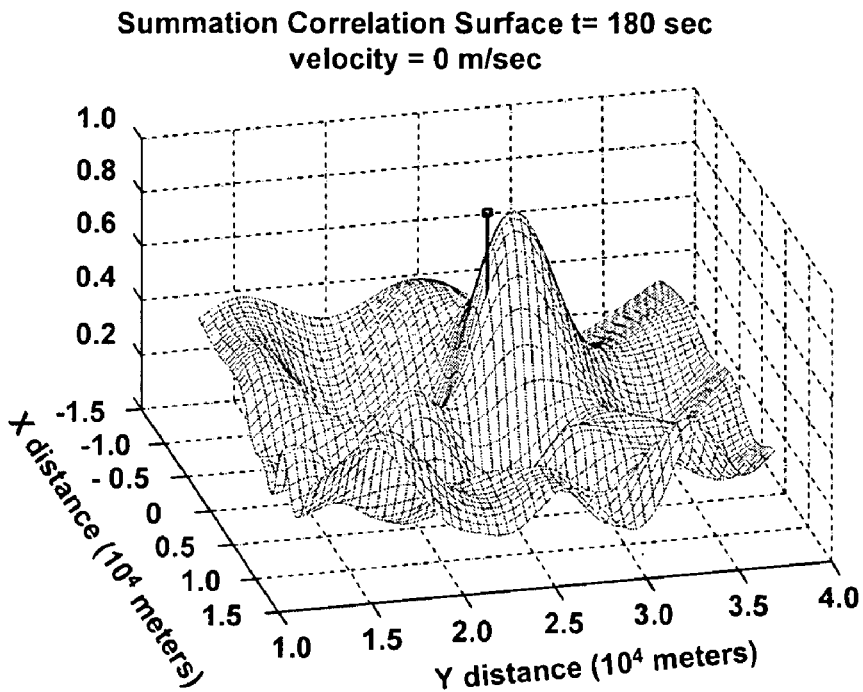
FIGS. 8A and 8B respectively show the summation correlation surface derived by summation and normalization of all the data from which the 180 correlation surfaces are derived assuming that the transmitter is not moving, and the summation correlation surface derived after it is determined that the transmitter is moving and using the calculated initial position, velocity and direction of motion of the transmitter.

The data sets for the one-hundred eighty measurement sets are correlated using geometrically mapped azimuth and elevation array manifolds using the summed and normalized equation in FIG. 10. During this initial processing step it is assumed that the transmitter is not moving so the velocity components of the equation are set to zero. When this summed and normalized data set is graphed it is as seen in FIG. 8A. This is called a summation correlation surface. The plotting of the summation correlation surface shown in FIG. 8A is not required to practice the teaching of the invention, but is shown and described herein to help understand the invention. The summed and normalized data set is first used to determine if the transmitter is stationary or is moving.

Summing the one-hundred eighty data sets reduces extraneous correlation peaks and develops a distinctive, maximum correlation peak with the highest point correlation peak being marked W as shown in FIG. 8A. The highest point W of the highest ridge line will be where the transmitter is located if the transmitter is not moving, but this is not known until the results are tested as described below. This is not true when the transmitter is moving. The peak position W is then erroneous and is caused by assuming that that the transmitter is not moving. When the transmitter is moving the actual location of the transmitter at t=0 may be on the side of the highest ridge as reflected by the dark vertical line in FIG. 8A.

To locate the highest peak W of the highest ridge line a conjugate gradient search routine is performed on the summation data set derived using partial derivative equations 11A and 11B with $v_x=v_y=0$. Such a search routine is well known in the art and is described elsewhere in this Detailed Description.

When the transmitter is not moving the highest peak of the first summation correlation surface shown in FIG. 8A will have a computed value of one or slightly less than one due to noise. The location of this peak indicates the x,y geolocation of a stationary transmitter and the peak can be located by a conjugate gradient search routine. When the transmitter is moving the highest peak W of the summation correlation surface will have a computed value that is significantly less than one. This is the case with FIG. 8A. This occurs because movement of the transmitter results in correlation surface ridges that are changing as the transmitter moves. This knowledge aids in the operation of the present invention. Empirically it is initially determined below what value of the highest peak of the summation correlation surface that the transmitter is moving, and above which the transmitter is stationary.

As described above, when the computed value of the highest peak of the summation correlation surface is equal or almost equal to one the transmitter is stationary and the x,y location of the peak found by the conjugate gradient search routine is the geolocation of the stationary transmitter. However, when the transmitter is moving while transmitting, the computed value is less than one and further correlation processing is required to locate the correct location of the moving transmitter.

The further processing is accomplished by performing another conjugate gradient search routine on the summation data set using equations 10, 11A.11B, 11C and 11D. The derivatives shown in 11C and 11D are easy to compute because of the following functional relationships.

Letting F=function of x and $v_x$ with x given by:

$$x = v_x \cdot t, \text{ giving } \frac{\partial x}{\partial v_x} = t$$

Therefore:

$$\frac{\partial F}{\partial v_x} = \frac{\partial F}{\partial x} \frac{\partial x}{\partial v_x} = \frac{\partial F}{\partial x} t$$

The velocity terms $v_x$ and $v_y$, during this second search are not set equal to zero. These terms and $(x_0,y_0)$ are computed as the conjugate gradient process climbs the 4 dimensional dependent correlation hill to $|R_{maximum}|^2$. The erroneous location initially computed W is utilized as a starting point for this second conjugate gradient search because it will be on the side of the actual highest ridge and not a lesser ridge. This type of error is described elsewhere in this Detailed Description.

Equations 10 and 11A-11D are based on the following terms:

$|R(vx^i, x^i, vy^j \text{ and } y^j)|^2$ defines the correlation surface over a set of $(x^i,y^j)$ grid points.

$v_x$ is the velocity component of the moving transmitter in the x direction.

$v_y$ is the velocity component of the moving transmitter in the y direction.

Me equals the number of sets of signal samples which is 180 herein.

$A(\theta,\phi)$ is the calibration array manifold $Q(n,t)$ are the eigen vectors for the received signals The initial search direction for the second conjugate gradient process is computed by the partial derivatives described by equations 11A-11D. Subsequent search directions are based on the conjugate gradient search routines associated with conjugate gradient algorithms. The mechanics of conjugate gradient searching are well known in the art and are described in more detail hereinafter. At the conclusion of the second round of conjugate gradient searching the true location at t=0 of the moving transmitter is known in addition to the velocity of the moving transmitter. The true location of the moving transmitter, at t=0, is identified by point Z in FIGS. 8A and 8B.

Figure 8B:
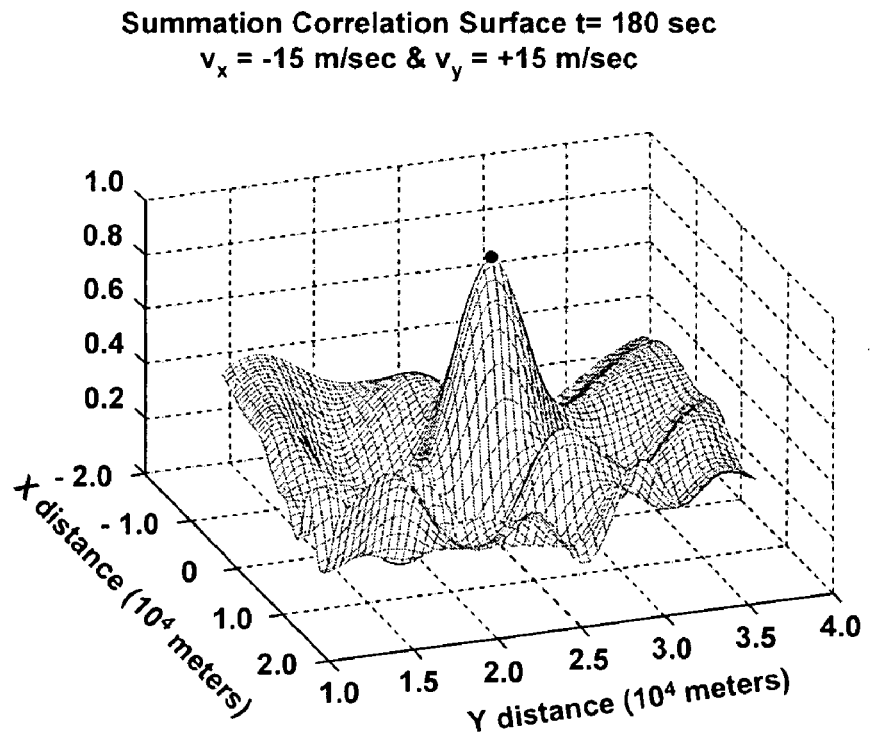

Normally, conjugate gradient searching must be performed starting at many points on the summation correlation surface in FIG. 8B. The reason for this is as follows. On a correlation surface it should be noted that there is the highest ridge peak line and lower ridge peak lines. If a starting point for a conjugate gradient searching sequence is chosen on the sloped side of a lower ridge line, the conjugate gradient searching will erroneously find a peak point on the lower ridge line and not on the highest ridge line. Thus, by using the erroneous peak W in FIG. 8A as the starting point the highest point Z on the highest ridge line will be found with minimal computation. In rare cases, this second highest correlation value will not be close to unity because the initial W was not in the neighborhood of the correct peak. In these cases exhaustive conjugate gradient searches must be performed using an index of starting grid locations that span the geographic area of interest. The highest correlation peak computed from all of these searches defines the correct geolocation.

Figure 9:
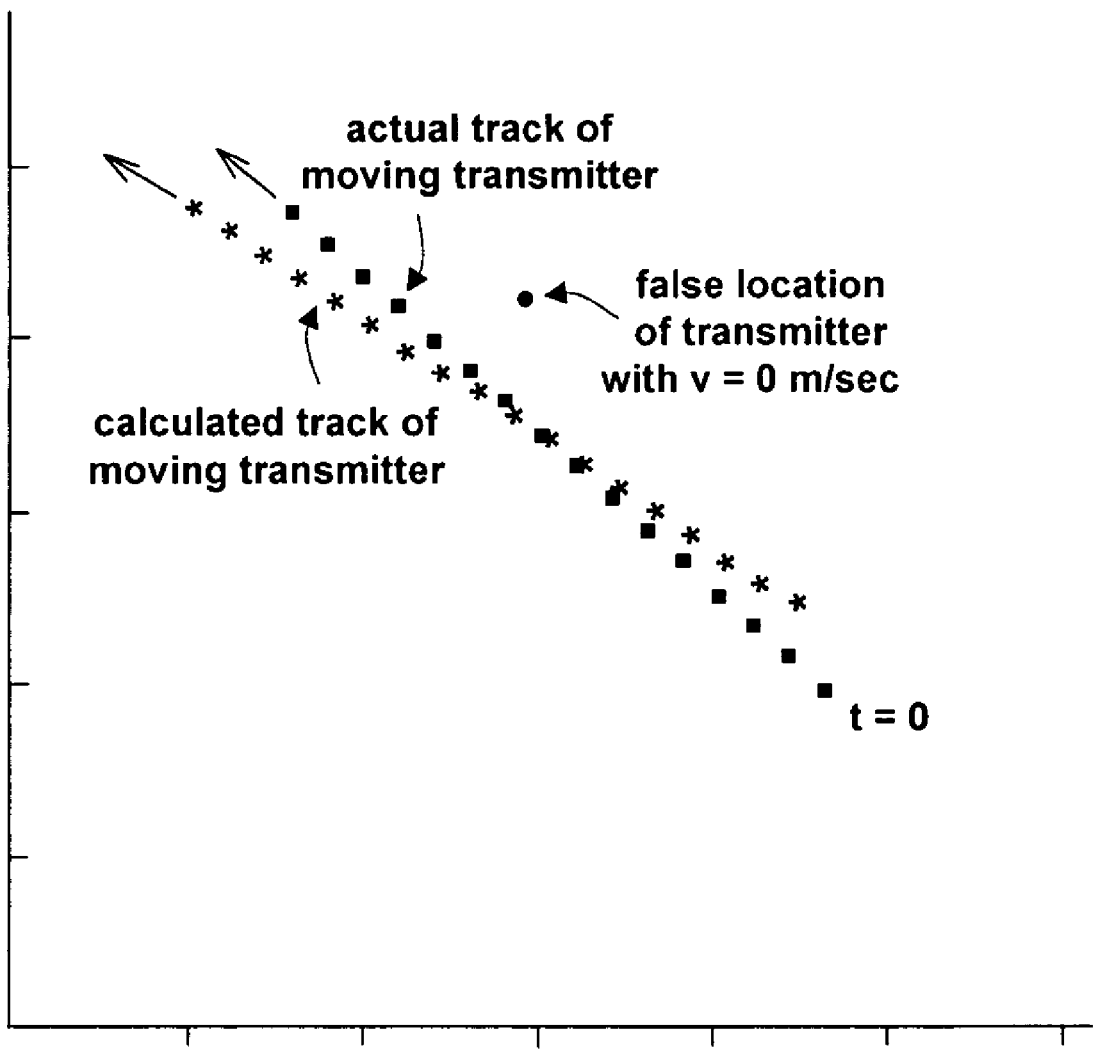
FIG. 9 is a chart showing the actual track of a moving transmitter, the track of the same transmitter calculated in accordance with the teaching of the invention, and the erroneous position of the transmitter determined when assuming that the transmitter is not moving.

Knowing the initial position of the moving transmitter at t=0 and the velocity and direction of motion of the transmitter a track can be calculated for the transmitter. This path is shown in FIG. 9 as track 42. During performance testing of the invention a transmitter was moved along a known track. When the known and calculated tracks are graphed we have FIG. 9. In FIG. 9 is shown a graph of the actual track 41 of the moving transmitter and the calculated track 42 of the transmitter. Also shown is position 40 which is the false location of the transmitter at t=0 and calculated by assuming that the transmitter is not moving. The error can be seen.

In the calculated plot 42 there is a 30 db signal to noise ratio assumed. If the signal to noise ratio is lower than this the track match will be poorer and visa versa. Between tracks 41 and 42, if the transmitter is moving at 50 mph, the error in the calculated location of the moving transmitter is only about 200 yards. Since new data is continuously received and processed as described above the error never increases beyond this if the signal to noise ratio doesn't decrease. Thus, the accuracy of tracking a moving transmitter is seen.

In conjugate gradient search Equations 11A-11D and 12 the term $|R(vx^i,x^i,vy^i,y^j)|^2$ defines the grid points defining a summation correlation surface over a set of $(x^i,y^j)$ grid points derived from the 180 sets of antenna signal data samples. The velocity vectors are $v_x$ and $v_y$ making up the measured velocity vector v. $Q_{m,n}$ is the set (Me) of 180 array vector measurements from antenna array 12 at in phase ip and quadrature phase qd, equal to the 180 data samples, given by the first signal array vector of each measured covariance matrix. qd is the quadrature phase which is ninety degrees out of phase with ip which is in phase. The term 1/Me normalizes the summation result by dividing the summation result by the number of data sets being summed. This yields values of the peak that are equal to one or less. $A_{m,n}(vx^i,x^i,vy^i,y^j)$ is the set of complex calibration vectors retrieved from the calibration array manifold for the received signal frequency after mapping from spherical angles $(\theta^i, \phi^j)$ to calculate the data used to define each correlation surface.

As mentioned above, the $v_x$ and $v_y$ velocity terms of the equation in FIG. 10 are initially disregarded and the 180 correlation surfaces are individually calculated, such as shown in FIGS. 5A through 7A. Then those correlation surfaces are summed and normalized by processing the data through the equation in FIG. 10 to get another set of data that when graphed show the summation correlation surface in FIG. 8A. It is not necessary to graph the summation correlation surface to practice the invention and this is done only to aid in understanding the invention.

The MT-CIGL geo-location of the present invention is based on a conjugate gradient multi-dimensional search for maximum of the function $|R(vx^i,x^i,vy^i,y^j)|^2$. For MT-CIGL the search for the maximum is implemented by searching for the minimum of $(1-|R|^2)$. The term $(1-R^2)$ causes the result of the conjugate gradient searching to be a minimum rather than a maximum. A starting point in the neighborhood of the minimum is selected and the gradient (equation (10) of $(1-|R|^2)$ as a function of x, y, vx, and vy for this point is computed. Next a line search for the minimum in this first gradient direction is solved for. At each line search minimum, a new gradient is computed which is then inserted into a conjugate gradient routine that computes the next direction for the line search which is then searched for a minimum, and so on. These search steps quickly converge to a minimum which is identified by slope gradient computations that are approximately equal to zero. The multipoint search path to the minimum point of $(1-|R|^2)$ is a path to the maximum of MT-CIGL $(|R|^2)$. The correlation function MT-CIGL $(|R|^2)$ is always less than unity, therefore $(1-|R|^2)$ is always greater than zero.

Conjugate gradient searching is well known in the prior art. See a book by W. H. Press, B. P. Flannery, S. A. Teukolsky and W. T. Vetterling, "Numerical Recipes", Cambridge University Press, Cambridge UK, 1986. It has been demonstrated that for certain types of functions, quadratic functions for example, the use of conjugate gradient direction processing allows convergence to a solution more quickly than the gradient direction. The standard conjugate gradient direction, when calculated at a given point, takes into account the direction of the previous step as well as the newly calculated gradient direction at the given point. If the direction of the step previously taken is designated by a vector B and the newly calculated gradient direction at the given point is designated as D, then the conjugate gradient direction at the given point is defined by the vector C in equation EQ 3 immediately below.

$$C_{conj}=D+hB \quad (EQ\ 3)$$

The term h is a constant which determines the "weight" afforded the previously selected direction. Although the error function to be dealt with herein is not a quadratic function, the technique of tempering the gradient direction based on its past performance has been found useful and is implemented in the present embodiment. For certain types of error functions, it has been found that the use of the conjugate gradient direction avoids the tortuous path of almost perpendicular steps which can arise when using a simple gradient technique.

Since the aircraft 19 on which the DF antenna array 12 is mounted in FIG. 2 creates perturbations such as electromagnetic scattering and glint, the results from the geolocation determination described above would have errors that must be compensated for. This compensation uses a calibration array manifold of calibration data developed during one or more test flights of the aircraft on which the Moving Transmitter Correlation Interferometer Geo Location (MT-CIGL) equipment of the present invention is located. There are actually multiple correlation tables created during system calibration at different frequencies over the range of frequencies that the MT-CIGL equipment will operate. During operation the correlation table used will be for the frequency closest to the frequency of a received signal.

To develop these calibration vectors the aircraft is flown over a plurality of known paths with respect to a transmitter which is at a known location. With both the position of the transmitter being known, and the position of the aircraft at any particular time being known, as determined by a navigational system, such as the global positioning system, the actual geolocation X,Y coordinates of the transmitter with respect to the aircraft at the time each measurement is taken is known. Each vector in spherical coordinates ($\theta,\phi$), along with data defining the actual X,Y geo-location of the transmitter when the vector is measured is stored in the array manifold calibration table. This is repeated a large plurality of times to create the calibration array manifold in all directions around the aircraft and at different frequencies over the frequency range at which the DF equipment will operate.

In the above description no mention is made of the polarization of received signals. Polarization independent direction finding is imperative if the receiving array cannot be made identically polarized to a received signal. This problem can arise, for example, when the receiving antennas are mounted on various locations on the aircraft. The interaction between the antennas and the aircraft can cause the relative magnitudes and phases between the antenna pairs to vary with incident signal polarization. Thus, it is advantageous to utilize an antenna array 12 of diversely polarized antennas since multiple signals can be resolved on the basis of polarization as well as angle of arrival (AOA). This added information improves AOA accuracy in general. For more information on performing direction finding with diversely polarized antenna arrays see a paper by E. R. Ferrara and T. M. Parks, "Direction Finding with an Array of Antennas Having Diverse Polarizations," IEEE Trans. Antennas Propagation, vol. AP-31, pp. 231-236, March 1983.

The present invention can be utilized with diversely polarized antennas in a DF antenna array. This is called Polarization Independent CIGL (PI-CIGL). PI-CIGL is designed to geo locate transmitters that are transmitting from arbitrarily or differently polarized antennas. PI-CIGL is designed to accomplish this task by using an antenna array having elements that are diversely polarized. PI-CIGL is based on the same measurement covariance matrices and eigenvalue decomposition as CIGL. PI-CIGL uses a dual calibration array manifold acquired by calibrating an aircraft DF antenna array using orthogonal polarizations such as vertical and horizontal and/or right and left circular.

Geolocation solutions based on PI-CIGL equations given below depend on searching over ($x^i, y^j$) space and identifying the transmitter location as the (x,y) value that maximizes the correlation value. This maximum also depends on the value of the complex polarization coefficients, $\rho^{p1}_m$ and $\rho^{p2}_m$. Since the value of these terms depends on the transmitter antenna they are usually unknown and must be solved for. This is accomplished by maximizing the PI-CIGL equation over these polarization parameters for each measurement period and each ($x^i, y^j$) grid and ($v_x, v_y$) velocity values for a geographic area search or conjugate gradient searches. PI-CIGL is, in terms of $\rho^{p1}_m$ and $\rho^{p2}_m$, the ratio of quadratic forms which can be maximized in closed form with the maximum given by the maximum eigenvalue of the characteristic equation of regular Hermitian forms. This maximization can be simplified if the array calibration manifolds are generated by mapping the data measured for array calibration into ortho-normal calibration manifolds as described below.

Assuming that two sets of antenna voltages are measured during transmissions from the same transmitter, the first set of antenna voltages based on radiation from a vertical transmit antenna, and the second set of antenna voltages based on radiation from a horizontal transmit antenna. The measured vectors are represented by $V^c(\theta^i, \phi^j)$ and $H^c(\theta^i, \phi^j)$ Linear combinations of these two sets of measurements are used to represent voltages established by arbitrarily polarized radiation. Ortho-normal calibration array manifolds are constructed from the two sets of measurements in the mathematical form:

$$\begin{bmatrix} A^{p1}(\theta^i, \phi^j) \\ A^{p2}(\theta^i, \phi^j) \end{bmatrix} = \begin{bmatrix} M^{i,j}(1,1) & M^{i,j}(1,2) \\ M^{i,j}(2,1) & M^{i,j}(1,2) \end{bmatrix} \begin{bmatrix} V^c(\theta^i, \phi^j) \\ H^c(\theta^i, \phi^j) \end{bmatrix} \quad (EQ\ 4)$$

where the center matrix M in equation EQ 4 establishes the equations of EQ 5 as shown immediately below.

$$\sum_{n=1}^{Na} A_n^{p1}(\theta^i, \phi^j) * A_n^{p1}(\theta^i, \phi^j) = 1 \quad (EQ\ 5)$$

$$\sum_{n=1}^{Na} A_n^{p2}(\theta^i, \phi^j) * A_n^{p1}(\theta^i, \phi^j) = 1$$

$$\sum_{n=1}^{Na} A_n^{p1}(\theta^i, \phi^j) * A_n^{p2}(\theta^i, \phi^j) = 0$$

Therefore, linear combinations of $A^{p1}(x^i, y^j)$ and $A^{p2}(x^i, y^j)$ can also represent voltages received under arbitrarily polarized radiation. Under these conditions, the simplified denominator of the PI-CIGL equation for each normalized set of $Q_m$ measurements is simply stated in equation EQ 6 immediately below.

$$[\rho^{p1} \rho^{p2}] \begin{bmatrix} 1 & 0 \\ 0 & 1 \end{bmatrix} \begin{bmatrix} \rho^{p1*} \\ \rho^{p2*} \end{bmatrix} \quad (EQ\ 6)$$

The maximized value of PI-CIGL, over the polarization parameters, is given by the sum of the maximum eigenvalues as shown in equation EQ 7 immediately below.

$$|R(x^j, y^j)|^2 = \frac{1}{Msts} \sum_{m=1}^{m=Msts} \{\lambda_m^{i,j}\} \quad (EQ\ 7)$$

where $\lambda^{i,j}_m$ is the maximum eigenvalue of the matrix as shown in equation EQ 8 immediately below.

$$\begin{bmatrix} |\sum Q^*_{m,n} A^{p1}_{m,n}(x^j, y^j)|^2 & \sum Q^*_{m,n} A^{p1}_{m,n}(x^j, y^j) \sum Q_{m,n} A^{p2}_{m,n}(x^j, y^j)^* \\ \sum Q^*_{m,n} A^{p2}_{m,n}(x^j, y^j) \sum Q_{m,n} A^{p1}_{m,n}(x^j, y^j)^* & |\sum Q^*_{m,n} A^{p2}_{m,n}(x^j, y^j)|^2 \end{bmatrix} \quad (EQ\ 8)$$

where the summation runs over the number of antennas, n=1:n=Na. The maximum eigenvalue of this |2×2| matrix is the extremely simple form shown in equation EQ 9 immediately below.

$$\lambda_m^{i,j} = |\sum Q^*_{m,n} A^{p1}_{m,n}(x^j, y^j)|^2 + |\sum Q^*_{m,n} A^{p2}_{m,n}(x^j, y^j)|^2 \quad (EQ\ 9)$$

With PI-CIGL processing using these equations, plus conjugate gradient searches as previously described, polarization independent direction finding may also be accomplished.

While what has been described herein is the preferred embodiment of the invention, numerous changes may be made without departing from the spirit and scope of the invention. For example, while the embodiment taught herein takes signal samples once every second for one-hundred eighty seconds at a 100 kilo Hertz rate for slightly longer than 10 milliseconds (a total of 1024 samples), these numbers may be changed for different RF bandwidths and measurement periods In addition, while working with only one signal at a time is described herein, other known technologies may be used to first separate co-channel interfering signals and geo-locate one or all of the incident waves.

The invention claimed is:

1. A method for locating a transmitter from which an electromagnetic signal is being received using a plurality of antennas and a plurality of receivers mounted on a moving platform, and indicating the geolocation and track of movement of the transmitter, and the geolocation of the transmitter when the transmitter is not moving, the method comprising the steps of:

(a) storing a plurality of sets of digitized samples of the electromagnetic signal received with the antennas and receivers;

(b) processing the plurality of digitized signal sample sets of step (a) to obtain a like plurality of signal array vectors;

(c) performing a first analysis of the digitized signal sample sets and their signal array vectors to locate a distinctive point having a peak value that may indicate the geolocation of the source of the electromagnetic signal, the first analysis being performed using an equation that has velocity terms but setting the velocity terms equal to zero;

(d) analyzing the peak value of the distinctive point from the first analysis to determine if the transmitter is moving or not moving, and when it is indicated that the transmitter is not moving that distinctive point identifies the geolocation of the transmitter;

(e) performing a second analysis of the digitized signal sample sets and their signal array vectors when it is determined in step (d) that the transmitter is moving, using the equation mentioned in step (c) with the velocity terms not set equal to zero, and using the distinctive point located in step (c) as the starting point of the second analysis, the result of the second analysis yielding the initial geolocation of the moving transmitter at the start of formation of the signal sample sets in step (a), a velocity vector and a direction vector of the moving transmitter; and (f) calculating a track of movement of the moving transmitter using the geolocation determined in step (e), the velocity vector and the direction vector determined in step (e).

2. The method for locating a transmitter of claim 1 further comprising the step of:

(g) summing and normalizing the sets of digitized samples of the electromagnetic signal and their signal array vectors to produce a normalized summation set of the digitized signals that has the distinctive point having a peak value that may indicate the geolocation of the source of the electromagnetic signal, the summing reducing extraneous peaks in the sets of digitized samples of the electromagnetic signal and their signal array vectors and developing a distinctive, maximum peak that may be the distinctive point, and the first analysis is performed on the normalized summation set of the digitized signals.

3. The method for locating a transmitter of claim 2 wherein the peak value analysis step (d) comprises the steps of:

(h) determining an empirical value; and (i) comparing the peak value of the distinctive point from the first analysis with the empirical value and if the peak value is greater than the empirical value the transmitter is not moving, and if the peak value is less than the empirical value the transmitter is moving.

4. The method for locating a transmitter of claim 3 wherein the received electromagnetic signal is subject to electromagnetic scattering perturbations caused by the platform on which the antennas and receivers are mounted, and wherein calibration testing of the receivers and antennas while mounted on the platform is performed and a plurality of array calibration vectors from the testing are derived and stored, and further comprising the step of:

(j) correlating each of the plurality of signal array vectors from step (b) with the stored array calibration vectors to obtain corrected geolocation based correlation data that is substantially unaffected by the perturbations and are used in the summing and normalizing performed in step (g).

5. The method for locating a transmitter of claim 4 wherein step (a) further comprises the steps of:

(k) digitizing the signals received with the plurality of antennas and receivers; and (l) sampling the digitized signals at the Nyquist rate and storing the samples in the plurality of covariance matrices.

6. The method for locating a transmitter of claim 5 further comprising the step of:

(n) performing an eigenvalue decomposition on the digitized signal samples stored in the plurality of covariant matrices to obtain the signal array vectors of step (b).

7. The method for locating a transmitter of claim 6 further comprising the step of:
(o) periodically repeating steps (a) through (n).

8. The method for locating a transmitter of claim 3 wherein the moving platform on which the antennas and receivers are mounted performs turns as the signal from the moving transmitter is being received in order to increase the accuracy of: (i) the determination of the initial geolocation of the moving transmitter at the start of formation of the signal sample sets, for use in calculating a track of movement of the moving transmitter in step (f), (ii) the velocity vector, and (ii) the direction vector of the moving transmitter determined by the second analysis in step (e).

9. The method for locating a transmitter of claim 1 wherein the peak value analysis step (d) comprises the steps of:
(g) determining an empirical value; and
(h) comparing the peak value of the distinctive point from the first analysis with the empirical value and if the peak value is greater than the empirical value the transmitter is not moving, and if the peak value is less than the empirical value the transmitter is moving.

10. The method for locating a transmitter of claim 9 wherein the received electromagnetic signal is subject to electromagnetic scattering perturbations caused by the platform on which the antennas and receivers are mounted, and wherein calibration testing of the receivers and antennas while mounted on the platform is performed and a plurality of array calibration vectors from the testing are derived and stored, and further comprising the step of:
(i) correlating each of the plurality of signal array vectors from step (b) with the stored array calibration vectors to obtain corrected geolocation based correlation data that is substantially unaffected by the perturbations.

11. The method for locating a transmitter of claim 10 wherein the moving platform on which the antennas and receivers are mounted performs turns as the signal from the moving transmitter is being received in order to increase the accuracy of: (i) the determination of the initial geolocation of the moving transmitter at the start of formation of the signal sample sets, for use in calculating a track of movement of the moving transmitter in step (f), (ii) the velocity vector, and (ii) the direction vector of the moving transmitter determined by the second analysis in step (e).

12. The method for locating a transmitter of claim 1 wherein the received electromagnetic signal is subject to electromagnetic scattering perturbations caused by the platform on which the antennas and receivers are mounted, and wherein calibration testing of the receivers and antennas while mounted on the platform is performed and a plurality of array calibration vectors from the testing are derived and stored, and further comprising the step of:
(g) correlating each of the plurality of signal array vectors from step (b) with the stored array calibration vectors to obtain corrected geolocation based correlation data that is substantially unaffected by the perturbations.

13. The method for locating a transmitter of claim 12 wherein step (a) further comprises the steps of:
(h) digitizing the signals received with the plurality of antennas and receivers; and
(i) sampling the digitized signals at the Nyquist rate and storing the samples in a plurality of covariance matrices.

14. The method for locating a transmitter of claim 1 wherein step (a) further comprises the steps of:
(g) digitizing the signals received with the plurality of antennas and receivers; and
(h) sampling the digitized signals at the Nyquist rate and storing the samples in a plurality of covariance matrices.

15. The method for locating a transmitter of claim 14 further comprising the step of:
(i) performing an eigenvalue decomposition on the digitized signal samples stored in the plurality of covariant matrices to obtain the signal array vectors of step (b).

16. The method for locating a transmitter of claim 15 wherein the moving platform on which the antennas and receivers are mounted performs turns as the signal from the moving transmitter is being received in order to increase the accuracy of: (i) the determination of the initial geolocation of the moving transmitter at the start of formation of the signal sample sets, for use in calculating a track of movement of the moving transmitter in step (f), (ii) the velocity vector, and (ii) the direction vector of the moving transmitter determined by the second analysis in step (e).

17. The method for locating a transmitter of claim 1 further comprising the step of:
(g) performing an eigenvalue decomposition on the digitized signal samples stored in the plurality of covariant matrices to obtain the signal array vectors of step (b).

18. The method for locating a transmitter of claim 17 further comprising the step of:
(h) summing and normalizing the sets of digitized samples of the electromagnetic signal and their signal array vectors to produce a normalized summation set of the digitized signals that has the distinctive point having a peak value that may indicate the geolocation of the source of the electromagnetic signal, the summing reducing extraneous peaks in the sets of digitized samples of the electromagnetic signal and their signal array vectors and developing a distinctive, maximum peak that may be the distinctive point, and the first analysis is performed on the normalized summation set of the digitized signals.

19. The method for locating a transmitter of claim 1 wherein the moving platform on which the antennas and receivers are mounted performs turns as the signal from the moving transmitter is being received in order to increase the accuracy of: (i) the determination of the initial geolocation of the moving transmitter at the start of formation of the signal sample sets, for use in calculating a track of movement of the moving transmitter in step (f), (ii) the velocity vector, and (ii) the direction vector of the moving transmitter determined by the second analysis in step (e).

20. The method for locating a transmitter of claim 1 further comprising the step of:
(g) periodically repeating steps (a) through (f).

* * * * *